(12) United States Patent
Walls

(10) Patent No.: US 9,988,826 B1
(45) Date of Patent: Jun. 5, 2018

(54) ANIMAL DOOR INTERFACE SYSTEM

(71) Applicant: Marshall G. Walls, Azle, TX (US)

(72) Inventor: Marshall G. Walls, Azle, TX (US)

( * ) Notice: Subject to any disclaimer, the term of this patent is extended or adjusted under 35 U.S.C. 154(b) by 0 days. days.

(21) Appl. No.: 15/470,260

(22) Filed: Mar. 27, 2017

Related U.S. Application Data

(60) Provisional application No. 62/326,084, filed on Apr. 22, 2016.

(51) Int. Cl.
*E05B 1/00* (2006.01)
*E05F 1/10* (2006.01)
*A01K 29/00* (2006.01)

(52) U.S. Cl.
CPC ............ *E05B 1/0015* (2013.01); *A01K 29/00* (2013.01); *E05F 1/10* (2013.01); *E05F 1/105* (2013.01); *E05F 1/1041* (2013.01)

(58) Field of Classification Search
CPC .......... A01K 29/00; E05F 1/10; E05F 1/1041; E05F 1/105; E05B 1/0015
USPC ........................................................ 49/460
See application file for complete search history.

(56) References Cited

U.S. PATENT DOCUMENTS

| | | | | |
|---|---|---|---|---|
| 642,661 A * | 2/1900 | Adams | .................. | E05B 1/0015 16/412 |
| 987,281 A * | 3/1911 | Upton | ..................... | B65D 9/14 217/47 |
| 3,391,674 A * | 7/1968 | Burleigh | ................ | A01K 1/035 119/174 |
| 3,676,895 A * | 7/1972 | Stewart | ................. | E05B 1/0015 16/412 |
| 3,874,118 A * | 4/1975 | Robinson | .................. | E06B 7/32 119/484 |
| 4,400,696 A * | 8/1983 | Klingensmith | ........ | A01K 1/035 119/174 |
| 4,840,217 A * | 6/1989 | Evans, III | ................. | E06B 7/32 160/180 |
| 4,894,883 A * | 1/1990 | Fleischhauer | ........... | E05F 1/105 16/66 |
| 4,991,256 A * | 2/1991 | Jeynes | .................... | E05F 1/105 16/61 |
| 6,189,183 B1 * | 2/2001 | Hartselle, III | ........ | E05B 1/0015 16/412 |
| 7,984,695 B1 * | 7/2011 | Shaffer | ..................... | E06B 7/32 119/501 |
| 8,707,622 B1 * | 4/2014 | Neustel, Jr. | ............. | E05F 13/02 49/263 |
| 9,303,434 B2 * | 4/2016 | Tarquinio | ................ | E05B 63/18 |

(Continued)

*Primary Examiner* — Gregory J Strimbu
(74) *Attorney, Agent, or Firm* — Richard G. Eldredge; Eldredge Law Firm

(57) ABSTRACT

An animal door system includes a door forming a body having: a front surface; a back surface; a first side; and a second side. The system further includes a plurality of hinges secured to the second side; a handle extending through a thickness of the body and configured to manipulate a latch extending through the first side of the body; a latch blocker secured over the latch and rigidly attached to the first side of the body; an animal interface rigidly secured to the first side of the body and configured to protrude relative to the front surface of the body; and an adjustable door return device secured to the back surface of the body of the door, the adjustable door return device is configured to return the door to a closed position.

2 Claims, 3 Drawing Sheets

(56) References Cited

U.S. PATENT DOCUMENTS

2015/0322705 A1* 11/2015 Lee .................. E05F 3/102
16/53

* cited by examiner

ANIMAL DOOR INTERFACE SYSTEM

BACKGROUND

1. Field of the Invention

The present invention relates generally to animal doors.

2. Description of Related Art

Conventional animal doors are well known in the art and are effective in most scenarios for assisting the animal to enter and exit a door. For example, system 101 includes a door 103 having hinges 105 secured to a first side 107 and pivotally attach to a supporting structure (not shown). The door also includes a handle 109 that manipulates a latch 100 on second side 111 for securing the door in a fixed position relative to the supporting structure. One of the unique features of system 101 is the use of an animal door 115 that covers opening 113 extending through the thickness of the door 103. During use, the animal door 115 pivots relative to front surface 117 of door 103. It should be understood that the door 115 is a flap typically composed of an elastic material.

One of the problems commonly associated with animal door 115 is that cold and hot air passes through cracks between the door 115 and the opening 113. The animal door 115 could also allow unwanted humans or animals, e.g., raccoons, snake, rodents, and the like through the door opening. Further, the opening 113 may not accommodate animals too large to fit therethrough.

Another problem commonly associated with installing an animal door 115 in a typical door is that a hole must be cut in the existing door. This requires the use of advanced construction techniques and tools that most people don't have.

Another problem is that once the animal door 115 has been installed if no longer needed it can't be removed.

Another problem is the size of the animal, it could be too big or that if the animal should outgrow the animal door 115.

Another problem is that it is not portable, it just can't be removed and carried with you.

Accordingly, although great strides have been made in the area of animal doors, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
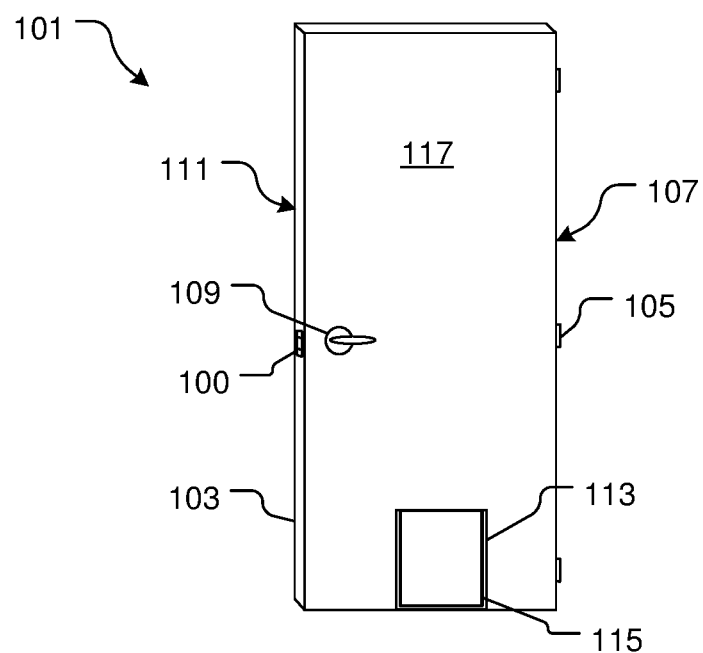
FIG. 1 is a front view of a conventional animal door.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
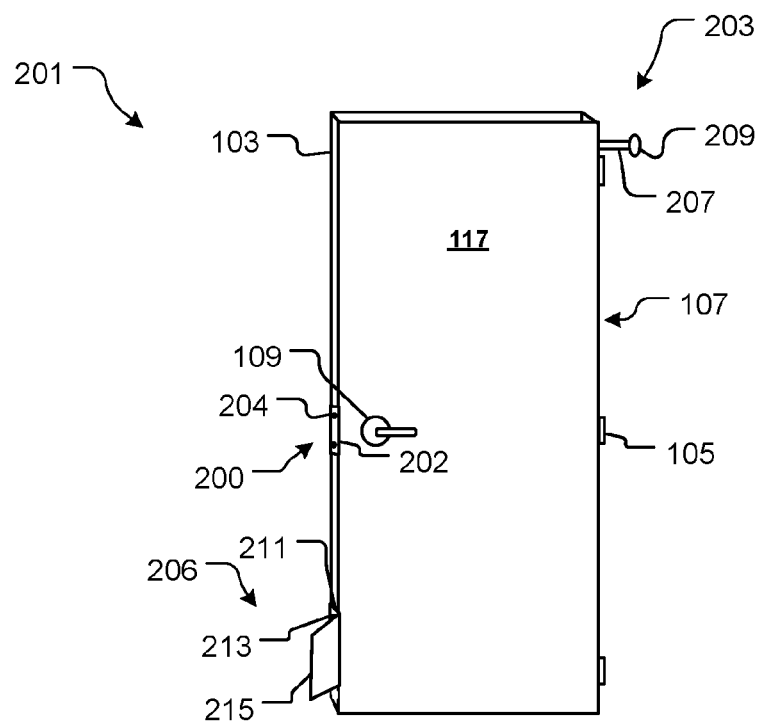
FIGS. 2A and 2B are respective front and back views of a preferred embodiment of the present application.
Figure 2B:
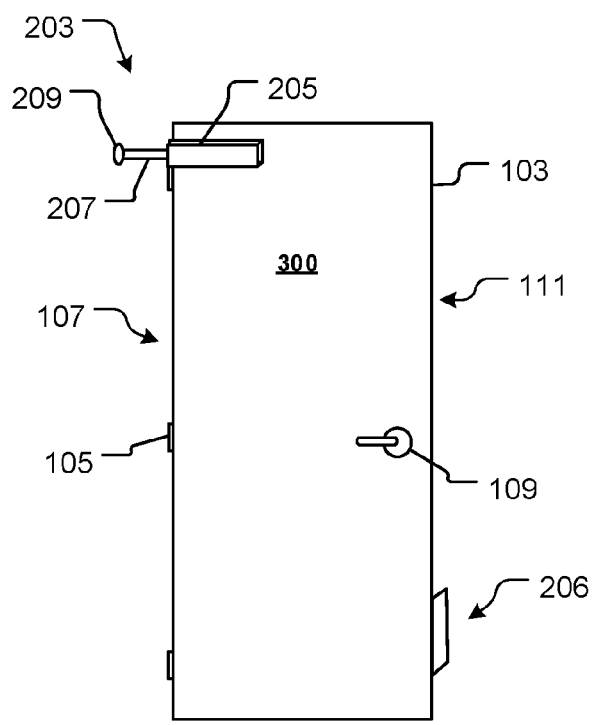

Referring now to the drawings wherein like reference characters identify corresponding or similar elements throughout the several views, FIGS. 2A and 2B depict respective front and back views of an animal door interface system 201 and method of use in accordance with a preferred embodiment of the present application. It will be appreciated that system 201 overcomes one or more of the above-listed problems commonly associated with the conventional animal doors.

In the contemplated embodiment, system 201 includes one or more of features of door 103 and further includes an adjustable door return device 203, an animal interface 206, and a latch blocker 200. It will be appreciated that system 201 could be utilized as a retrofit to existing doors. For example, the animal door interface system 201 is easy to install, no special tools or measurements are required. The animal door interface system 201 does not damage the door and is easy to remove. The animal door interface system 201 works with all size animals.

The adjustable door return device 203 preferably includes one or more of a housing 205 rigidly secured to back surface 300 of door 103. The housing 205 carries a spring and/or similarly suitable device configured to return the door 103 back to the closed position after pivoting movement caused by the animal via the animal interface 206. In the exemplary embodiment, a rod 207 secures to the spring disposed within housing 205 and secures to the supporting structure via a mount 209.

The system 201 is further provided with a latch blocker 200 having a plate 202 configured to cover the latch 100. The plate 202 is secured to side 111 via one or more fasteners 204. In the preferred embodiment, the plate 202 remains flush with the side 111 so as to prevent the door from latching.

Figure 3:
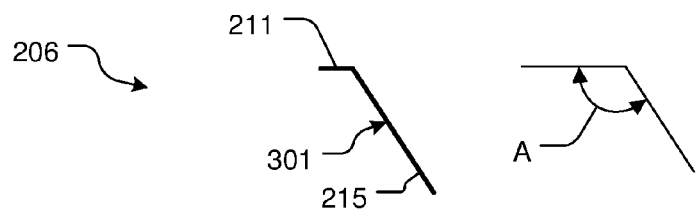
FIG. 3 is a top view of the animal interface of the system of FIGS. 2A and 2B.

The animal interface 206 includes a body with two sections 211, 215 integral with each other. In the contemplated embodiment section 211 secures flush with side 111 via one or more fasteners 213, while section 215 extends at an angle relative to section 211 and at an angle relative to side 111, as depicted in FIG. 3. In one contemplated embodiment, angle "A" is 135 degrees; however, other angles are also contemplated. During use, the animal applies pressure against surface 301, which in turn opens the door via the hinges. It will be appreciated that section 215 is angled so that the face of the animal comes in contact with the section 215 prior to the surface of the second side 111.

Figure 4:
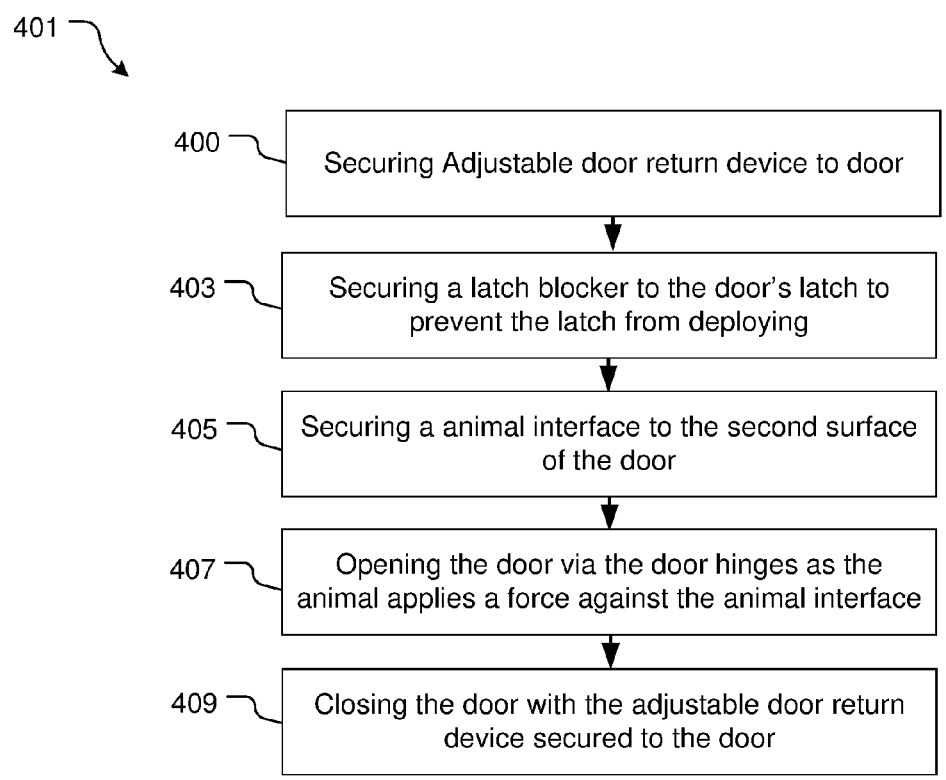
FIG. 4 is a flowchart depicting the preferred process.

FIG. 4 depicts a flowchart 401 with the preferred method of use that incorporates the features of system 201 discussed above. For example, the latch blocker is secured over the latch, the animal interface is secured to the second side of the door, and the adjustable door return device is secured to the back surface of the door and to the supporting structure. During use, the animal applies pressure against the animal interface or the back surface, which in turn pivots the door open via the hinges. The door is then returned back to the original closed position via the adjustable door return device. These features are depicted in boxes 400-411 of FIG. 4.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An animal door system, comprising:
    a door forming a body having:
        a front surface;
        a back surface;
        a first side; and
        a second side;
    a plurality of hinges secured to the second side;
    a handle extending through a thickness of the body and configured to manipulate a latch extending through the first side of the body;
    a latch blocker secured over the latch and solely attached to the first side of the body, the latch blocker having a plate secured over the latch, the plate is configured to retain the latch within the thickness of the body;
    an animal interface is attached solely to the first side of the body of the door and protrudes at an angle relative to the front surface of the body of the door, the animal interface having:
        a first section secured solely to the first side; and
        a second section integral with the first section and extending at an angle relative to the first section; and
    an adjustable door return device secured to the back surface of the body, the adjustable door return device is configured to return the door to a closed position, the adjustable door return device is positioned outside the door.

2. The system of claim 1, wherein the angle between the first section and the second section is 135 degrees.

* * * * *